United States Patent

Takeuchi et al.

[11] Patent Number: 5,807,645
[45] Date of Patent: Sep. 15, 1998

[54] DISCHARGE PROMOTER MIXTURE FOR REDUCING CELL SWELLING IN ALKALI METAL ELECTROCHEMICAL CELLS

[75] Inventors: Esther S. Takeuchi, East Amherst; William C. Thiebolt, III, Tonawanda, both of N.Y.

[73] Assignee: Wilson Greatbatch Ltd., Clarence, N.Y.

[21] Appl. No.: 878,040

[22] Filed: Jun. 18, 1997

[51] Int. Cl.⁶ ..................................................... H01M 4/62
[52] U.S. Cl. .......................... 429/218; 429/232; 29/623.1
[58] Field of Search ..................................... 429/218, 232; 29/623.1

[56] References Cited

U.S. PATENT DOCUMENTS

| | | | |
|---|---|---|---|
| 4,166,888 | 9/1979 | Rao et al. | 429/194 |
| 5,154,992 | 10/1992 | Berberick et al. | 429/197 |
| 5,308,714 | 5/1994 | Crespi | 429/224 |
| 5,567,539 | 10/1996 | Takahashi et al. | 429/57 |
| 5,569,558 | 10/1996 | Takeuchi et al. | 429/122 |
| 5,670,277 | 9/1997 | Barker et al. | 429/220 |

*Primary Examiner*—Stephen Kalafut
*Attorney, Agent, or Firm*—Hodgson, Russ, Andrews, Woods, & Goodyear LLP

[57] ABSTRACT

An electrode comprising acetylene black or carbon black carbonaceous diluent having a surface area less than about 100 m²/gram mixed with graphite and a charge transfer active material to provide an electrode active admixture, is described. The carbonaceous diluent/graphite blend increases the charge transfer capability within the electrode while exhibiting diminished cell swelling in comparison to high surface area carbonaceous diluents. A preferred carbonaceous diluent is SHAWINIGAN BLACK® carbon.

53 Claims, No Drawings

DISCHARGE PROMOTER MIXTURE FOR REDUCING CELL SWELLING IN ALKALI METAL ELECTROCHEMICAL CELLS

BACKGROUND OF THE INVENTION

1. Field of the Invention

The present invention relates to the conversion of chemical energy to electrical energy, and more particularly to a blend of discharge promoter additives consisting essentially of a relatively low surface area carbonaceous diluent and graphite mixed with a charge transfer active material to provide a novel electrode admixture. According to the present invention, the electrode admixture is particularly useful as a cathode in an alkali metal electrochemical cell. The low surface area carbonaceous diluent/graphite mixture of the present invention increases the charge transfer capability within the electrode while exhibiting diminished cell swelling in comparison to high surface area carbonaceous diluents, whether used alone or with graphite.

2. Prior Art

It has been documented that certain types of cell chemistries swell during discharge. Such swelling has been attributed to several factors. For example, one of the problems encountered in the discharge of metal oxide cells such as manganese dioxide cells is that the casing can swell from gas production. U.S. Pat. No. 5,308,714 to Crespi teaches that the inclusion of minor amounts of $V_6O_{13}$ mixed with the cathode material in a $Li/MnO_2$ cell retards the formation of gases normally attributed to moisture from manganese dioxide, which is highly hygroscopic.

In addition to moisture derived gassing, swelling in metal, metal oxide, metal sulfide and mixed metal oxide cells has been found to be related to the type of carbonaceous diluent used in the cathode mix. Specifically, the swelling of silver vanadium oxide cells containing only low surface area carbonaceous diluents and graphite according to the present invention is less than in cells of a similar chemistry containing at least some high surface area carbonaceous diluent material. Further, the discharge performance of cells including a relatively low surface area carbonaceous diluent and graphite in the cathode mix as the discharge promoter components according to the present invention is comparable to cells of a similar cathode chemistry containing a relatively high surface area carbonaceous diluent, whether with or without graphite. This is an unexpected result because of the surface area differences.

SUMMARY OF THE INVENTION

The object of the present invention is, therefore, to improve the discharge swelling characteristics of both primary and secondary electrochemical cells comprising a solid charge transfer active material, for example a metal, a metal oxide, a metal sulfide, a mixed metal oxide material or a carbonaceous active material, having a relatively low surface area carbonaceous diluent and graphite as discharge promoter components blended therewith. It is also an object of the present invention to provide a nonaqueous electrochemical cell that is particularly advantageous for implantable medical applications due to its reduced case swelling during discharge.

These and other objects are accomplished by the provision of a charge transfer active material having mixed therewith a relatively low surface area carbonaceous diluent and graphite as discharge promoter components and an electrochemical cell incorporating the same. In particular, the present invention is directed to the inclusion of a minor amount of a low surface area carbonaceous diluent and a greater amount of graphite as discharge promoter materials added to a cathode active material. The cathode active material is more particularly a mixed metal oxide such as silver vanadium oxide or copper silver vanadium oxide, and the low surface area carbonaceous diluent preferably has a surface area of less than about 100 $m^2$/gram, and more preferably, less than about 75 $m^2$/gram. According to the present invention, the discharge performance of a cell comprising a cathode electrode including a minor amount of a relatively low surface area carbonaceous diluent and a greater amount of graphite as the sole discharge promoter components is comparable to those containing a relatively high surface area carbonaceous diluent, with or without graphite, with the added benefit that swelling is reduced during discharge.

As used herein, the terms carbonaceous conductive diluent or conductive diluent mean both carbon black and acetylene black. Acetylene black is a carbonaceous material that is prepared by the formation of polyaromatic macromolecules in the vapor phase. The macromolecules are then converted to the product material by burning the gaseous hydrocarbons in a limited supply of air at about 1,000° C. Carbon black is formed by nucleation of the vapor phase macromolecules into droplets, which are then converted to the product by burning the liquid hydrocarbons in a limited supply of air at about 1,000° C.

These and other aspects of the present invention will become more apparent to those skilled in the art by reference to the following description.

DETAILED DESCRIPTION OF THE INVENTION

It has been well documented that carbonaceous additives are useful as conductive diluents when mixed with solid electrode active materials, such as metals, metal oxides, metal sulfides, mixed metal oxides and carbonaceous materials, for the purpose of aiding in the discharge rate capability of the charge transfer active materials. Discharge rate capability is enhanced because the carbonaceous materials provide increased surface area in the electrode where charge transfer can take place.

Thus, solid electrode components for incorporation into a cell according to the present invention include a solid charge transfer active material or a solid electrode active material mixed with at least one relatively low surface area discharge promoter component or conductive diluent and graphite. The conductive diluent of the present invention is selected from the group consisting of carbon black and acetylene black. While more than one type or grade of conductive diluent can be mixed with graphite and the electrode active material, according to the present invention all of the conductive diluents including the graphite must have a total internal and external surface area less than about 100 $m^2$/gram. More particularly, the preferred conductive diluent according to the present invention consists substantially of discrete, connected carbonaceous particles of acetylene black having a particle size diameter between about 0.02 to 0.10 microns, and a total external and internal surface area less than about 100 $m^2$/gram, more preferably less than about 75 $m^2$/gram.

A most preferred carbonaceous diluent is an acetylene black material available from Chevron U.S.A. Inc. under the trademark SHAWINIGAN BLACK®, commonly referred to as "SAB". This material has a total external and internal surface area of about 55 to 75 m²/gram by the BET method. Almost all of the surface area of the preferred conductive diluent is external so that the conductive material has a relatively low porosity. The SAB conductive diluent has about 99.3% carbon and about 0.6% volatiles, and a resistivity of about 0.035 ohm/inch³ to about 0.05 ohm/inch³, making the carbonaceous material an excellent conductor. SHAWINIGAN BLACK has the following typical physical properties:

| Typical Properties | Acetylene Black (Shawinigan[a]) |
|---|---|
| Surface area (m²/g) | 67 |
| Particle diameter (µm) | 43 |
| $L_c$ (Å) | 31 |
| Ash content (wt. %) | <0.05 |
| Organic extract (wt. %) | 0.04 |
| ASV[b] (cm³ acetone/5 g) | 29 |
| Density (kg/m³) | 70 |

[a]Gulf Oil Chemicals Company, Englewood Cliffs, NJ
[b]Absorption stiffness value.

Other materials commonly referred to as carbon black and acetylene black are also beneficial in the present invention as long as their surface area is less than about 100 m²/gram, and more preferably less than about 75 m²/gram. For the purpose of the present invention, while graphite is a carbonaceous based material, it is not considered to be a "carbonaceous conductive diluent", but is a distinct discharge promoter material that is mixed with the conductive diluent and the charge transfer active material to provide an electrode. Preferably about 1 to 10 weight percent of the low surface area carbonaceous diluent is mixed with graphite and the electrode active material to provide an electrode component.

Graphite as that term is used in the present application is generally referred to as artificial graphite produced by heating petroleum to remove volatiles and then mixing the resultant with coal-tar pitch. The mixture is consolidated and shaped by molding or extruding to produce a "green body." The green body is then heated to about 1,000° C. in a nonoxidizing atmosphere to expel the volatile constituents from the pitch. The resulting material is an amorphous carbon that consists of petroleum-coke particles held together by a porous pitch residue. In the final step, carbon is transformed to graphite by heat treatment at 2,500° C. to 3,000° C. The resulting artificial graphite product has the following physical properties:

| Physical Property | Artificial Graphite |
|---|---|
| Bulk density (g/cm³) | 1.6 |
| Gas permeability (cm²/s) | $10^{-2}$ |
| Tensile strength (kg/cm²) | 420 |
| Thermal expansion (°C.)$^{-1}$ × 10⁶ | 1–3 |
| Thermal conductivity (cal/cm s ● °C.) | 0.3–0.4 |
| Electrical resistivity (Ω ● cm) × 10⁴ | 7 |

Preferably, the graphite is present in the electrode active admixture in a quantity of about it to about 10%, by volume, and more preferably about 2 to 8%, by weight. For a more detailed discussion of graphite, reference is made to Carbon-Electrochemical and Physical Properties by Kim Kinoshita of Lawrence Berkeley Laboratory, Berkeley Calif., published by John Wiley & Sons (1988), which is hereby incorporated in its entirety by reference.

Suitable charge transfer active materials or electrode active materials include metals, metal oxides, metal sulfides, mixed metal oxides and carbonaceous active materials, and mixtures thereof. One preferred mixed metal oxide has the general formula $SM_xV_2O_y$ wherein SM is a metal selected from the Groups IB to VIIB and VIII of the Periodic Table of elements and x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$ in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combinations and mixtures of phases thereof.

Another preferred composite cathode material includes $V_2O_z$ wherein z≦5 combined with $Ag_2O_z$ wherein z=0 to 1 and $CuO_z$ wherein z=0 to 1 to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material composition found for $Cu_xAg_yV_2O_z$ is preferably about 0.01≦x≦1.0, about 0.01≦y≦1.0 and about 5.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium.

Additional cathode active materials include manganese dioxide, lithium cobalt oxide, lithium nickel oxide, copper oxide, titanium disulfide, copper sulfide, iron sulfide, iron disulfide, copper vanadium oxide, carbon and fluorinated carbon, and mixtures thereof. The cathode active material is preferably present in the cathode at about 80 to 99 weight percent.

Solid cathode active components for incorporation into a cell according to the present invention may be prepared by rolling, spreading or pressing a mixture of one or more of the above listed electrode active materials, the preferred carbonaceous conductive diluent and graphite onto a current collector with the aid of a binder material. The conductive diluent is preferably present in the electrode active admixture in a minor amount compared to the graphite. Thus, the SAB conductive diluent is present in about 0.5 to 2 weight percent while the graphite is present in about 1 to 3 weight percent. The most preferred formulation is 1 weight percent carbonaceous conductive diluent and 2 weight percent graphite. Preferred binder materials include a powdered fluoro-resin such as powdered polytetrafluoroethylene (PTFE) or powdered polyvinylidene fluoride present at about 1 to about 5 weight percent of the electrode active material. Suitable materials for the cathode current collector include a thin sheet or metal screen, for example, a titanium, stainless steel, aluminum or nickel screen. Cathodes prepared according to the present invention may be in the form of one or more plates operatively associated with at least one or more plates of anode material, or in the form of a strip wound with a corresponding strip of anode material in a structure similar to a "jellyroll".

Anode active materials acceptable for use with the present cathode electrode comprise metals selected from Groups IA and IIA of the Periodic Table of the Elements, including lithium, sodium, potassium, calcium, magnesium or their alloys, or any alkali metal or alkali-earth metal capable of functioning as an anode. Alloys and intermetallic compounds include, for example, Li-Si, Li-Al, Li-Mg, Li-B and Li-Si-B alloys and intermetallic compounds. In that case, the anode active material preferably comprises lithium. The form of the anode may vary, but typically, the anode comprises a thin sheet or foil of the anode metal, and a current collector contacted to the anode material.

In order to prevent internal short circuit conditions, the cathode of the present invention is separated from the Group IA anode material by a suitable separator material. The separator is of electrically insulative material and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include woven and non-woven fabrics of polyolefinic fibers including polyvinylidine fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent or, a single solvent. The ionically conductive salt serves as the vehicle for migration of the anode ions to intercalate or react with the cathode active material. Preferably the ion-forming alkali metal salt is similar to the alkali metal comprising the anode.

Suitable nonaqueous electrolytes are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous solvents are substantially inert to the anode and cathode electrode materials and preferred low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2-dimethoxyethane (DME), and others. Preferred high permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL) and N-methyl-pyrrolidinone (NMP) and others.

Known lithium salts that are useful as a vehicle for transport of alkali metal ions from the anode to the cathode and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CF_3$, $LiSO_3F$, $LiB(C_6H_5)_4$ and $LiCF3SO_3$, and mixtures thereof. Suitable salt concentrations typically range between about 0.8 to 1.5 molar, and in the preferred electrochemical cell comprising the Li/SVO couple, the preferred electrolyte is 1.0M to 1.2M $LiAsF_6$ in a 50:50, by volume mixture of DME:PC.

The relatively low surface area conductive diluent of the present invention is also useful in an alkali metal ion cell. Such rechargeable cells are typically constructed in a discharged state. The alkali metal ions, such as lithium, comprising a lithiated cathode are then intercalated into a carbonaceous anode by applying an externally generated electrical potential to recharge the cell. The applied recharging electrical potential serves to draw the alkali metal ions from the cathode including the low surface area conductive diluent according to the present invention, through the separator via the electrolyte and into the carbonaceous material of the anode to saturate the same. The cell is then provided with an electrical potential and is discharged in a usual manner. Particularly useful lithiated materials that are stable in air and readily handled include lithiated nickel oxide, lithiated manganese oxide, lithiated cobalt oxide and lithiated mixed oxides of cobalt with nickel or tin. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, nickel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following example describes the manner and process of carrying out the present invention in an electrochemical cell, and this example sets forth the best mode contemplated by the inventors of carrying out the invention, but it is not to be construed as limiting.

EXAMPLE I

Thirty-six prismatic lithium/silver vanadium oxide cells were built having a central cathode flanked on either side by the lithium anode. The cells were designated with Ser. Nos. 70718 to 70753. The cells were divided into four groups as follows: Group I according to the present invention contained, by weight, about 94% silver vanadium oxide, 3% polytetrafluoroethylene (PTFE) binder, about 1% Chevron SHAWINIGAN BLACK® carbon and about 2% graphite; Group II contained, by weight, 94% SVO, 3% PTFE and 3% graphite with no carbonaceous diluent; Group III had, by weight, about 95% silver vanadium oxide, 3% PTFE and 2% KETJENBLACK®, a relatively high surface area carbon available from Akzo Chemicals B. V., but no graphite; and Group IV served as a control. The control cell group included cathode electrodes containing, by weight, about 94% silver vanadium oxide, 3% PTFE, 2% graphite and 1% KETJENBLACK®. Table 1 sets forth the proportion of materials, by weight, in the various cell groups and Table 2 presents some of the physical characteristics of the two carbonaceous diluents used to construct the cells discussed above:

TABLE 1

| Cell Group | SVO | PTFE | Carbon | Graphite |
|---|---|---|---|---|
| I | 94 | 3 | 1 (SAB) | 2 |
| II | 94 | 3 | 0 | 3 |
| III | 95 | 3 | 2 (KETJ) | 0 |
| IV | 94 | 3 | 1 (KETJ) | 2 |

TABLE 2

| Carbon | Surface Area, $m^2/g$ | mean particle size, $\mu m$ | bulk density, g/cm3 |
|---|---|---|---|
| KETJENBLACK® | 800–1000 | ~30 | ~0.145 |
| SHAWINIGAN BLACK® | 60–70 | ~40 | ~0.0945–0.1026 |

Three cells from each group were assigned to accelerated, pulse discharge or 3.01 KΩ or 5 KΩ constant resistance discharge. The thicknesses of the cells were measured periodically throughout discharge, and the discharge capacity to various voltage cut-offs and the change in cell thickness from before to after completion of discharge are presented in Tables 3, 4 and 5, respectively. Accelerated discharge in this example comprised application of a train of pulses to the respective cells each half hour. Each train consisted of four 2.0 amp pulses of 10 seconds duration with 15 seconds rest between each pulse. The discharge capacity to various voltage cut-offs and the change in cell thickness after completion of discharge for those cells subjected to accelerated pulse discharge are presented in Table 3.

TABLE 3

| Cell Group | Serial No. | mAh to: 2V | 1.7V | 1.5V | Total Δ Thickeness in. |
|---|---|---|---|---|---|
| I | 70719 | 1336 | 1738 | 1835 | −0.002 |
|  | 70728 | 1469 | 1779 | 1876 | −0.005 |
|  | 70730 | 1400 | 1741 | 1847 | −0.002 |
| II | 70720 | 1096 | 1656 | 1781 | −0.002 |
|  | 70744 | 1227 | 1720 | 1824 | −0.002 |
|  | 70750 | 41 | 594 | 789 | −0.002 |
| III | 70724 | 1596 | 1787 | 1864 | +0.017 |
|  | 70733 | 1637 | 1819 | 1894 | +0.014 |
|  | 70745 | 1624 | 1805 | 1883 | +0.017 |
| IV | 70731 | 1479 | 1785 | 1871 | +0.002 |
|  | 70732 | 1434 | 1788 | 1880 | +0.001 |
|  | 70734 | 1480 | 1798 | 1898 | −0.001 |

For those cells that were subjected to accelerated pulse discharge, thickness changes from before to after testing for the Group I cells containing a minor amount of the low surface area SHAWINIGAN BLACK® carbon and a greater amount of graphite, and the Group II cells containing all graphite were negative (cells got thinner by 0.002 in. to 0.005 in.) while the change in thickness in the control cells ranged from −0.001 in. to +0.002 inches. The Group III cells containing all high surface area KETJENBLACK® carbon increased in thickness by 0.014 in. to 0.017 in.

The poor performance of the cell indicated as Ser. No. 70750 was unexplained.

The capacity to various voltage cut-offs and the change in cell thickness after completion of discharge for those cells subjected to the 3.01 KΩ constant resistance load presented in Table 4.

TABLE 4

| Cell Group | Serial No. | mAh to: 2V | 1.7V | 1.5V | Total Δ Thickness, in. |
|---|---|---|---|---|---|
| I | 70718 | 2197 | 2415 | 2486 | +0.054 |
|  | 70726 | 2196 | 2413 | 2487 | +0.057 |
|  | 70738 | 2207 | 2421 | 2495 | +0.057 |
| II | 70722 | 2116 | 2167 | 2206 | +0.033 |
|  | 70736 | 2194 | 2404 | 2458 | +0.048 |
|  | 70753 | 2209 | 2415 | 2475 | +0.053 |
| III | 70721 | 2222 | 2436 | 2550 | +0.075 |
|  | 70743 | 2235 | 2437 | 2562 | +0.070 |
|  | 70751 | 2234 | 2435 | 2562 | +0.073 |
| IV | 70735 | 2214 | 2421 | 2571 | +0.078 |
|  | 70741 | 1967 | 2171 | 2323 | +0.082 |
|  | 70749 | 2230 | 2430 | 2563 | +0.072 |

All groups of cells discharged under the 3 KΩ constant resistance load showed an increase in thickness concurrent with reaching 2.0 V under load. The Group III, all KETJENBLACK® cells showed a gradual increase throughout life while the other groups did not swell until their voltages reached 2.0 V. Swelling was greatest in the all KETJENBLACK® carbon and control cells (≧0.072") and least in the graphite cells (≦0.053") of Group II. Both cathode swelling and electrolyte decomposition (gas formation) were deemed responsible for this. Electrolyte decomposition occurred in all the cells regardless of the type of carbonaceous diluent used.

The discharge capacity of the Group I, SHAWINIGAN BLACK®/graphite cells is not statistically significantly different in comparison to the Group II, graphite cells, the Group III, KETJENBLACK® cells and the Group IV, control cells discharged under the 3.01 KΩ constant resistance load.

The capacity to various voltage cut-offs and the change in cell thickness after completion of discharge for those cells subjected to the 5 KΩ constant resistance load are presented in Table 5.

TABLE 5

| Cell Group | Serial No. | mAh to: 2V | 1.7V | 1.5V | Total Δ Thickness, in. |
|---|---|---|---|---|---|
| I | 70725 | 2278 | 2441 | 2531 | 0.072 |
|  | 70746 | 2259 | 2420 | 2526 | 0.075 |
|  | 70748 | 2314 | 2481 | 2582 | 0.063 |

TABLE 5-continued

| Cell Group | Serial No. | mAh to: 2V | 1.7V | 1.5V | Total Δ Thickness, in. |
|---|---|---|---|---|---|
| II | 70739 | 2247 | 2462 | 2516 | 0.065 |
|  | 70740 | 2261 | 2425 | 2504 | 0.069 |
|  | 70742 | 2262 | 2425 | 2501 | 0.066 |
| III | 70729 | 2295 | 2470 | 2588 | 0.070 |
|  | 70747 | 2317 | 2488 | 2615 | 0.064 |
|  | 70752 | 2284 | 2462 | 2592 | 0.069 |
| IV | 70723 | 2285 | 2454 | 2579 | 0.086 |
|  | 70727 | 2277 | 2446 | 2589 | 0.079 |
|  | 70737 | 2258 | 2427 | 2583 | 0.078 |

For those cells discharged under the 5 KΩ constant resistance load, all of the cell groups showed an increase in thickness concurrent with reaching 2.0 V under load. The Group III, all KETJENBLACK® carbon cells showed a gradual increase throughout discharge while the other cell groups did not swell until their voltages reached 2.0 V. Swelling was greatest in the control cells of Group IV which recorded increases in thickness of about 0.078 in. to 0.086 in. The cells in Group I having the SHAWINIGAN BLACK® carbon diluent and graphite according to the present invention swelled about 0.063 in. to 0.075 in., the Group III cells containing the KETJENBLACK® carbon swelled 0.064 in. to 0.070 in. and the Group II cells having graphite but no carbon swelled about 0.065 in. to 0.069 in. Again, electrolyte decomposition (as evidenced by gas release upon case violation) occurred in all the cells regardless of the type of carbonaceous diluent used.

The discharge capacity of the Group I, SHAWINIGAN BLACK®/graphite cells is not statistically significantly different in comparison to the Group II, graphite cells, the Group III, KETJENBLACK®/graphite cells and the Group IV, control cells discharged under the 5 KΩ constant resistance load.

The results of this example clearly establish that the discharge performance of cells including a relatively low surface area carbonaceous diluent and graphite as the discharge promoter components in the cathode mix according to the present invention is comparable to cells of a similar cathode chemistry containing at least some of a relatively high surface area carbonaceous diluent. However, the cell swelling attributed to the discharge promoter component is markedly decreased when only a low surface area carbonaceous diluent along with graphite is provided in the cathode mix according to the present invention.

It is appreciated that various modifications to the inventive concepts described herein may be apparent to those skilled in the art without departing from the spirit and scope of the present invention defined by the hereinafter appended claims.

What is claimed is:

1. An electrochemical cell, which comprises:
   a) an anode;
   b) a cathode comprising a cathode active material mixed with graphite and at least one carbonaceous conductive diluent having a surface area less than about 100 m²/gram; and
   c) an electrolyte activating and operatively associating the anode and the cathode, wherein the carbonaceous conductive diluent/graphite mixture increases the charge transfer capability within the electrode while exhibiting diminished swelling during discharge.

2. The electrochemical cell of claim 1 wherein the carbonaceous conductive diluent is selected from the group consisting of carbon black and acetylene black, and mixtures thereof.

3. The electrochemical cell of claim 1 wherein the carbonaceous conductive diluent consists substantially of discrete, connected carbonaceous particles of acetylene black.

4. The electrochemical cell of claim 3 wherein the particles have a diameter of about 0.02 microns to about 0.10 microns.

5. The electrochemical cell of claim 1 wherein the carbonaceous conductive diluent has a surface area of about 55 to 75 m²/gram.

6. The electrochemical cell of claim 1 wherein the carbonaceous conductive diluent has a total external and internal surface area of about 55 to 75 m²/gram by the BET method, about 99.3% carbon and about 0.6% volatiles, a resistivity of about 0.035 ohm/inch³ to about 0.05 ohm/inch³, particle diameter of about 43 μm, $L_c$(Å) of about 31, ash content of less than about 0.05 weight percent, organic extract of about 0.04 weight percent, absorption stiffness value of about 29 cm³ acetone/5 grams and a density of about 70 kg/m².

7. The electrochemical cell of claim 1 wherein the carbonaceous conductive diluent is present in the cathode at about 1% to about 10%, by weight.

8. The electrochemical cell of claim 1 wherein the graphite is present in the cathode at about 2 to 8%, by weight.

9. The electrochemical cell of claim 1 wherein the cathode active material is selected from the group consisting of manganese dioxide, copper silver vanadium oxide, copper vanadium oxide, silver vanadium oxide, titanium disulfide, copper oxide, copper sulfide, iron sulfide, iron disulfide, carbon and fluorinated carbon, and mixtures thereof.

10. The electrochemical cell of claim 1 wherein the cathode includes a current collector selected from the group consisting of titanium, aluminum, stainless steel and nickel, and mixtures thereof.

11. The electrochemical cell of claim 1 wherein the anode comprises an alkali metal.

12. The electrochemical cell of claim 1 including a casing selected from the group consisting of nickel, titanium, stainless steel and aluminum, and mixtures thereof.

13. The electrochemical cell of claim 12 wherein the anode contacts the casing in a case-negative configuration.

14. The electrochemical cell of claim 1 wherein the electrolyte solution operatively associated with the anode and the cathode comprises an ion-forming alkali metal salt dissolved in a nonaqueous solvent, and wherein the alkali metal of the salt is similar to an alkali metal comprising the anode.

15. The electrochemical cell of claim 14 wherein the alkali metal of the anode comprises lithium and the ion-forming alkali metal salt comprising the electrolyte solution is selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CF_3$, $LiSO_3F$, $LiB(C_6H_5)_4$ and $LiCF_3SO_3$, and mixtures thereof.

16. The electrochemical cell of claim 14 wherein the nonaqueous solvent comprises an organic solvent selected from the group consisting of tetrahydrofuran, methyl acetate, diglyme, triglyme, acetonitrile, dimethyl sulfoxide, dimethyl formamide, dimethyl acetamide, diethyl carbonate, propylene carbonate, ethylene carbonate, butylene carbonate, tetraglyme, dimethyl carbonate, dipropyl carbonate, methyl ethyl carbonate, methyl propyl carbonate, ethyl propyl carbonate, 1,2-dimethoxyethane, γ-butyrolacetone and N-methyl-pyrrolidinone, and mixtures thereof.

17. An alkali metal ion cell, which comprises:
 a) an alkalated cathode comprising a cathode active material mixed with graphite at least one carbonaceous conductive diluent having a surface area less than about 100 m$^2$/gram, wherein the carbonaceous conductive diluent/graphite mixture increases the charge transfer capability within the electrode while exhibiting diminished swelling during discharge;
 b) an anode material capable of intercalating an alkali metal; and
 c) an electrolyte activating and operatively associating the anode and the cathode.

18. The cell of claim 17 wherein the carbonaceous conductive diluent is selected from the group consisting of carbon black and acetylene black, and mixtures thereof.

19. The cell of claim 17 wherein the carbonaceous conductive diluent consists substantially of particles having a diameter of about 0.02 microns to about 0.10 microns.

20. The cell of claim 17 wherein the carbonaceous conductive diluent has a surface area of about 55 to 75 m$^2$/gram.

21. The cell of claim 17 wherein the carbonaceous conductive diluent has a total external and internal surface area of about 55 to 75 m$^2$/gram by the BET method, about 99.3% carbon and about 0.6% volatiles, a resistivity of about 0.035 ohm/inch$^3$ to about 0.05 ohm/inch$^3$, particle diameter of about 43 μm. $L_c$(Å) of about 31. ash content of less than about 0.05 weight percent, organic extract of about 0.04 weight percent, absorption stiffness value of about 29 cm$^3$ acetone/5 grams and a density of about 70 kg/m$^2$.

22. The cell of claim 17 wherein the carbonaceous conductive diluent is present in the cathode at about 1% to about 10%, by weight.

23. The cell of claim 17 wherein the graphite is present in the cathode at about 2 to 8%, by weight.

24. The cell of claim 17 wherein the cathode active material is selected from the group consisting of alkalated nickel oxide, alkalated manganese oxide, alkalated cobalt oxide and alkalated mixed oxides of cobalt with nickel or tin, and mixtures thereof.

25. The cell of claim 17 wherein the electrolyte solution operatively associated with the anode and the cathode comprises an ion-forming alkali metal salt dissolved in a nonaqueous solvent, and wherein the alkali metal of the salt is similar to an alkali metal comprising the alkalated cathode.

26. An electrode for an electrochemical cell, the electrode comprising:
 a) an electrode active material;
 b) graphite; and
 c) at least one carbonaceous conductive diluent having a surface area less than about 100 m$^2$/gram, wherein the carbonaceous conductive diluent/graphite mixture increases the charge transfer capability within the electrode while exhibiting diminished swelling during discharge.

27. The electrode of claim 26 wherein the carbonaceous conductive diluent is selected from the group consisting of carbon black and acetylene black, and mixtures thereof.

28. The electrode of claim 26 wherein the second carbonaceous conductive diluent has a total external and internal surface area of about 55 to 75 m$^2$/gram by the BET method, about 99.3% carbon and about 0.6% volatiles, a resistivity of about 0.035 ohm/inch$^3$ to about 0.05 ohm/inch$^3$, particle diameter of about 43 μm, $L_c$(Å) of about 31, ash content of less than about 0.05 weight percent, organic extract of about 0.04 weight percent, absorption stiffness value of about 29 cm$^3$ acetone/5 grams and a density of about 70 kg/m$^2$.

29. The electrode of claim 26 wherein the carbonaceous conductive diluent is mixed with the electrode active material in a percentage of about 1% to about 10%, by weight.

30. The electrode of claim 26 wherein the graphite is present in the cathode at about 2 to 8%, by weight.

31. The electrode of claim 26 wherein the electrode active material is selected from the group consisting of manganese dioxide, copper silver vanadium oxide, copper vanadium oxide, silver vanadium oxide, titanium disulfide, copper oxide, copper sulfide, iron sulfide, iron disulfide, carbon and fluorinated carbon, and mixtures thereof.

32. A method of providing an electrochemical cell, comprising the steps of:
 a) providing a casing;
 b) providing an anode inside the casing;
 c) providing graphite;
 d) providing at least one carbonaceous conductive diluent having a surface area less than about 100 m$^2$/gram, wherein the carbonaceous conductive diluent is mixed with a cathode active material and the graphite to provide a cathode inside the casing, wherein the carbonaceous conductive diluent/graphite mixture increases the charge transfer capability within the electrode while exhibiting diminished swelling during discharge; and
 e) activating and operatively associating the anode and the cathode by filling an electrolyte into the casing.

33. The method of claim 32 including selecting the carbonaceous conductive diluent from the group consisting of carbon black and acetylene black, and mixtures thereof.

34. The method of claim 32 including providing the carbonaceous conductive diluent consisting substantially of discrete, connected carbonaceous particles of acetylene black.

35. The method of claim 32 including providing the particles having a diameter of about 0.02 microns to about 0.10 microns.

36. The method of claim 32 including providing the carbonaceous conductive diluent having a surface area of about 55 to 75 m$^2$/gram.

37. The method of claim 32 including providing the carbonaceous conductive diluent having a total external and internal surface area of about 55 to 75 m$^2$/gram by the BET method, about 99.3% carbon and about 0.6% volatiles, a resistivity of about 0.035 ohm/inch$^3$ to about 0.05 ohm/inch$^3$, particle diameter of about 43 μm, $L_c$(Å) of about 31, ash content of less than about 0.05 weight percent, organic extract of about 0.04 weight percent, absorption stiffness value of about 29 cm$^3$ acetone/5 grams and a density of about 70 kg/m$^2$.

38. The method of claim 32 including providing the carbonaceous conductive diluent present in the cathode at about 1% to about 10%, by weight.

39. The method of claim 32 including providing the graphite present in the cathode at about 1% to about 10%, by weight.

40. The method of claim 32 including selecting the cathode active material from the group consisting of manganese dioxide, copper silver vanadium oxide, copper vanadium oxide, silver vanadium oxide, titanium disulfide, copper oxide, copper sulfide, iron sulfide, iron disulfide, carbon and fluorinated carbon, and mixtures thereof.

41. The method of claim 32 including providing the cathode having a current collector selected from the group consisting of titanium, aluminum, stainless steel and nickel, and mixtures thereof.

42. The method of claim 32 including providing the anode comprising an alkali metal.

43. The method of claim 32 including selecting the casing from the group consisting of nickel, titanium, stainless steel and aluminum, and mixtures thereof.

44. The method of claim 32 including providing the electrolyte solution operatively associated with the anode and the cathode comprising an ion-forming alkali metal salt dissolved in a nonaqueous solvent, and wherein the alkali metal of the salt is similar to an alkali metal comprising the anode.

45. The method of claim 44 including providing the alkali metal of the anode comprising lithium and selecting the ion-forming alkali metal salt comprising the electrolyte solution from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)$, $LiSCN$, $LiO_3SCF_2CF_3$, $LiC_6F_5SO_3$, $LiO_2CF_3$, $LiSO_3F$, $LiB(C_6H_5)_4$ and $LiCF_3SO_3$, and mixtures thereof.

46. The method of claim 44 including providing the nonaqueous solvent comprising an organic solvent selected from the group consisting of tetrahydrofuran, methyl acetate, diglyme, triglyme, acetonitrile, dimethyl sulfoxide, dimethyl formamide, dimethyl acetamide, diethyl carbonate, propylene carbonate, ethylene carbonate, butylene carbonate, tetraglyme, dimethyl carbonate, dipropyl carbonate, methyl ethyl carbonate, methyl propyl carbonate, ethyl propyl carbonate 1,2-dimethoxyethane, γ-butyrolacetone and N-methyl-pyrrolidinone, and mixtures thereof.

47. A method of providing an electrode, comprising the steps of:
   a) providing a current collector;
   b) providing graphite;
   c) providing at least one carbonaceous conductive diluent having a surface area less than about 100 $m^2$/gram, wherein the carbonaceous conductive diluent is mixed with a cathode active material and the graphite to provide an electrode active admixture, wherein the carbonaceous conductive diluent/graphite mixture increases the charge transfer capability within the electrode while exhibiting diminished swelling during discharge; and
   d) contacting the electrode active admixture to the current collector to provide the electrode.

48. The method of claim 47 including selecting the carbonaceous conductive diluent from the group consisting of carbon black and acetylene black, and mixtures thereof.

49. The method of claim 47 including providing the carbonaceous conductive diluent having a total external and internal surface area of about 55 to 75 $m^2$/gram by the BET method, about 99.3% carbon and about 0.6% volatiles, a resistivity of about 0.035 ohm/$inch^3$ to about 0.05 ohm/$inch^3$, particle diameter of about 43 μm, $L_c$(Å) of about 31, ash content of less than about 0.05 weight percent, organic extract of about 0.04 weight percent, absorption stiffness value of about 29 $cm^3$ acetone/5 grams and a density of about 70 kg/$m^2$.

50. The method of claim 47 including providing the carbonaceous conductive diluent present in the cathode at about 1% to about 10%, by weight.

51. The method of claim 47 including providing the graphite present in the cathode at about 1% to about 10%, by weight.

52. The method of claim 47 including selecting the electrode active material from the group consisting of manganese dioxide, copper silver vanadium oxide, copper vanadium oxide, silver vanadium oxide, titanium disulfide, copper oxide, copper sulfide, iron sulfide, iron disulfide, carbon and fluorinated carbon, and mixtures thereof.

53. The method of claim 47 including selecting the current collector from the group consisting of titanium, aluminum, stainless steel and nickel, and mixtures thereof.

* * * * *